(12) United States Patent
Higuchi et al.

(10) Patent No.: US 11,562,765 B2
(45) Date of Patent: Jan. 24, 2023

(54) MASK ESTIMATION APPARATUS, MODEL LEARNING APPARATUS, SOUND SOURCE SEPARATION APPARATUS, MASK ESTIMATION METHOD, MODEL LEARNING METHOD, SOUND SOURCE SEPARATION METHOD, AND PROGRAM

(71) Applicant: NIPPON TELEGRAPH AND TELEPHONE CORPORATION, Tokyo (JP)

(72) Inventors: Takuya Higuchi, Tokyo (JP); Tomohiro Nakatani, Tokyo (JP); Keisuke Kinoshita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 360 days.

(21) Appl. No.: 16/971,656

(22) PCT Filed: Feb. 19, 2019

(86) PCT No.: PCT/JP2019/005976
§ 371 (c)(1),
(2) Date: Aug. 20, 2020

(87) PCT Pub. No.: WO2019/163736
PCT Pub. Date: Aug. 29, 2019

(65) Prior Publication Data
US 2020/0395037 A1    Dec. 17, 2020

(30) Foreign Application Priority Data

Feb. 22, 2018  (JP) .............................. JP2018-029969

(51) Int. Cl.
*G10L 25/00* (2013.01)
*G10L 25/30* (2013.01)
(Continued)

(52) U.S. Cl.
CPC ................. *G10L 25/30* (2013.01); *G06N 3/08* (2013.01); *G06N 7/005* (2013.01); *G10L 25/03* (2013.01)

(58) Field of Classification Search
None
See application file for complete search history.

(56) References Cited

U.S. PATENT DOCUMENTS

2019/0318754 A1* 10/2019 Le Roux .............. G06N 3/0481
2020/0043517 A1*  2/2020 Jansson .................... G06N 3/08
(Continued)

OTHER PUBLICATIONS

Chen et al. "Deep Attractor Network for Single—Microphone Speaker Separation", Proceedings of 2017 IEEE International Conference on Acoustics, Speech, and Signal Processing, Mar. 2017, 5 pages.
(Continued)

*Primary Examiner* — Satwant K Singh

(57) ABSTRACT

A mask estimation apparatus for estimating mask information for specifying a mask used to extract a signal of a specific sound source from an input audio signal includes a converter which converts the input audio signal into embedded vectors of a predetermined dimension using a trained neural network model and a mask calculator which calculates the mask information by fitting the embedded vectors to a mixed Gaussian model.

9 Claims, 6 Drawing Sheets

(51) Int. Cl.
*G06N 3/08* (2006.01)
*G06N 7/00* (2006.01)
*G10L 25/03* (2013.01)

(56) References Cited

U.S. PATENT DOCUMENTS

2020/0342891 A1* 10/2020 Deng ............... G10L 21/0264
2020/0365152 A1* 11/2020 Han ..................... G10L 15/02
2021/0366502 A1* 11/2021 Kinoshita ............ G10L 21/028

OTHER PUBLICATIONS

Hershey, John R., "Deep Clustering: Discriminative Embeddings for Segmentation and Separation", Proceedings of 2016 IEEE International Conference on Acoustics, Speech, and Signal Processing, Mar. 2016, 5 pages.

* cited by examiner

MASK ESTIMATION APPARATUS, MODEL LEARNING APPARATUS, SOUND SOURCE SEPARATION APPARATUS, MASK ESTIMATION METHOD, MODEL LEARNING METHOD, SOUND SOURCE SEPARATION METHOD, AND PROGRAM

CROSS-REFERENCE TO RELATED APPLICATIONS

This application is a U.S. 371 Application of International Patent Application No. PCT/JP2019/005976, filed on 19 Feb. 2019, which application claims priority to and the benefit of JP Application No. 2018-029969, filed on 22 Feb. 2018, the disclosures of which are hereby incorporated herein by reference in their entireties.

TECHNICAL FIELD

The present invention relates to a sound source separation technique for separating audio signals in which sounds from a plurality of sound sources are mixed into signals for the respective sound sources.

BACKGROUND ART

Sound source separation techniques for separating audio signals in which sounds from a plurality of sound sources are mixed into signals for the respective sound sources include a sound source separation technique of which sounds collected through a plurality of microphones are a target, and a sound source separation technique of which sounds collected through a single microphone are a target. In the latter case, information about the position of the microphone cannot be used and thus it is regarded as more difficult than the former case.

NPL 1 is known as a technique for performing sound source separation on the basis of information on input audio signals without using information about the position of a microphone as in the problem of the latter.

In NPL 1, input audio signals are converted into embedded vectors through a bi-directional long short-term memory (BLSTM) and then the embedded vectors are clustered into a cluster for each sound source according to the k-means method to estimate a mask for extracting a sound source belonging to each cluster. In learning of parameters of the BLSTM, the parameters of the BLSTM are updated such that a distance between a teacher mask (a mask of a correct solution) provided in advance and an estimated mask is minimized. During operation, input audio signals are converted into embedded vectors using the BLSTM with the trained parameters and the result is clustered according to the k-means method to obtain a mask estimation result.

CITATION LIST

Non Patent Literature

[NPL 1] Zhuo Chen, Yi Luo, and Nima Mesgarani, "Deep attractor network for single-microphone speaker separation", arXiv preprint arXiv: 1611.08930v2, 2017.

SUMMARY OF THE INVENTION

Technical Problem

In NPL 1, a mask is estimated from embedded vectors using the Softmax function during learning whereas a mask is estimated by applying the k-means method to embedded vectors to cluster the embedded vectors during operation. That is, since criteria for mask estimation during learning and during operation are different, it cannot be said that parameter learning of BLSTM optimal for input audio signals during operation is performed and thus the accuracy of sound source separation is likely to decrease during operation.

An object of the present invention is to improve the accuracy of sound source separation during operation by estimating a mask using the same method during learning and during operation.

Means for Solving the Problem

A mask estimation apparatus according to one aspect of the present invention is a mask estimation apparatus for estimating mask information for specifying a mask used to extract a signal of a specific sound source from an input audio signal, which includes: a converter which converts the input audio signal into embedded vectors of a predetermined dimension using a trained neural network model; and a mask calculator which calculates the mask information by fitting the embedded vectors to a mixed Gaussian model.

Furthermore, a model learning apparatus according to one aspect of the present invention is a model learning apparatus for learning a neural network model used to estimate mask information for specifying a mask used to extract a signal of a specific sound source from an input audio signal, which includes: a converter which converts input audio signals for learning and for which mask information is known in advance into embedded vectors of a predetermined dimension using the neural network model; a mask calculator which calculates a mask information estimation result by fitting the embedded vectors to a mixed Gaussian model; and a parameter update unit which updates parameters of the neural network model until a result of comparison between the mask information estimation result and the mask information known in advance satisfies a predetermined criterion.

Furthermore, a sound source separation apparatus according to one aspect of the present invention is a sound source separation apparatus for extracting a signal of a specific sound source from an input audio signal, which includes: a converter which converts the input audio signal into embedded vectors of a predetermined dimension using a trained neural network model; a mask calculator which calculates mask information for specifying a mask used to extract a signal of a specific sound source from the input audio signal by fitting the embedded vectors to a mixture Gaussian model; and a sound source separator which extracts the signal of the specific sound source from the input audio signal using the mask information.

Furthermore, a mask estimation method according to one aspect of the present invention is a mask estimation method executed by a mask estimation apparatus for estimating mask information for specifying a mask used to extract a signal of a specific sound source from an input audio signal, the mask estimation method including the steps of: converting the input audio signal into embedded vectors of a predetermined dimension using a trained neural network model; and calculating the mask information by fitting the embedded vectors to a mixed Gaussian model.

Furthermore, a model learning method according to one aspect of the present invention is a model learning method executed by a model learning apparatus for learning a neural network model used to estimate mask information for specifying a mask used to extract a signal of a specific sound source from an input audio signal, the model learning method including the steps of: converting input audio signals for learning and for which mask information is known in advance into embedded vectors of a predetermined dimension using the neural network model; calculating a mask information estimation result by fitting the embedded vectors to a mixed Gaussian model; and updating parameters of the neural network model until a result of comparison between the mask information estimation result and the mask information known in advance satisfies a predetermined criterion.

Furthermore, a sound source separation method according to one aspect of the present invention is a sound source separation method executed by a sound source separation apparatus for extracting a signal of a specific sound source from an input audio signal, the sound source separation method including the steps of: converting the input audio signal into embedded vectors of a predetermined dimension using a trained neural network model; calculating mask information for specifying a mask used to extract a signal of a specific sound source from the input audio signal by fitting the embedded vectors to a mixture Gaussian model; and extracting the specific sound source from the input audio signal using the mask information.

Furthermore, a program according to one aspect of the present invention is a program for causing a computer to serve as each unit of the aforementioned apparatuses.

Effects of the Invention

According to the present invention, it is possible to improve the accuracy of sound source separation during operation by estimating a mask using the same method during learning and during operation.

DESCRIPTION OF EMBODIMENTS

Hereinafter, embodiments of the present invention will be described with reference to the drawings.

Figure 1:
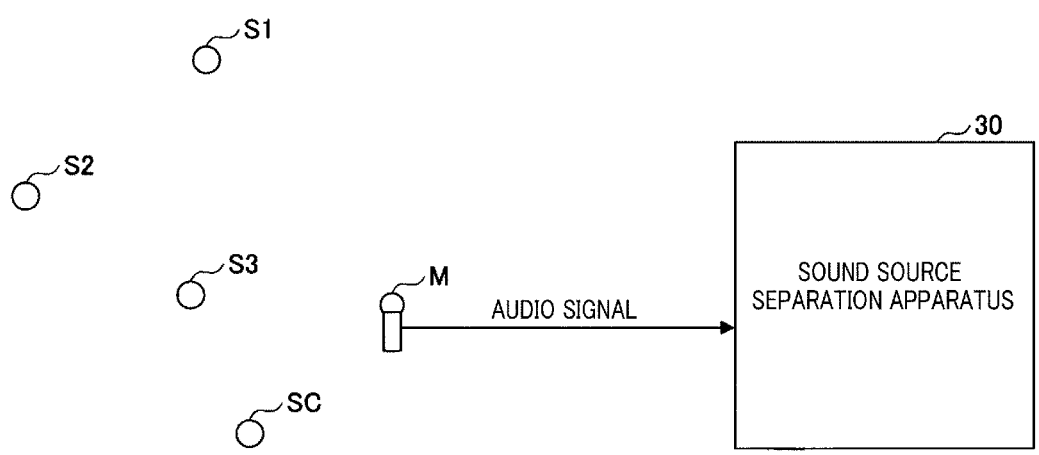
FIG. 1 is a diagram illustrating a system configuration example in an embodiment of the present invention.
Figure 2:
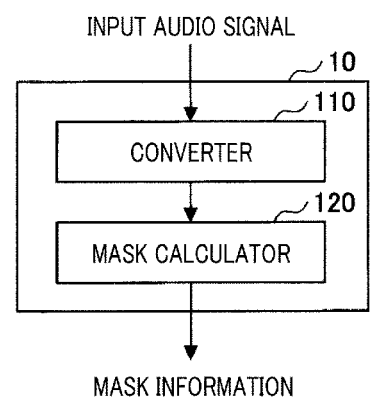
FIG. 2 is a diagram illustrating a functional configuration of a mask estimation apparatus in Embodiment 1 of the present invention.

FIG. 1 is a diagram illustrating a system configuration example in an embodiment of the present invention. In FIG. 1, a microphone M can collect sounds from a plurality of sound sources that can be clustered into C classes S1 to SC. The microphone M outputs the collected sounds to a sound source separation apparatus 30 as an audio signal. However, the sound source separation apparatus 30 of the present embodiment is not limited to cases in which sounds collected through a microphone are directly input to the sound source separation apparatus 30, and the operation may be performed by storing sounds collected through a microphone or the like in media, a hard disk or the like and reading the stored audio signals with the sound source separation apparatus 30, for example.

The sound source separation apparatus 30 is an apparatus that receives audio signals as an input and outputs a signal of a specific sound source. The sound source separation apparatus 30 can output a signal of a specific sound source alone or output a signal of each sound source. The sound source separation apparatus 30 uses a mask for extracting a signal of a specific sound source from input audio signals. The sound source separation apparatus 30 uses a neural network model in order to estimate mask information for specifying a mask. Meanwhile, the mask information includes parameters for determining a mask as well as information on the mask. The sound source separation apparatus 30 learns the neural network model using input audio signals for learning prepared in advance during learning (mask information is assumed to be known in advance). During operation, the sound source separation apparatus 30 calculates mask information using the neural network model (a neural network for which parameters have been set) trained during learning.

Meanwhile, learning of the neural network model and calculation of the mask information in the sound source separation apparatus 30 may be performed by separate apparatuses or the same apparatus. In the description of the following embodiment, they are performed by separate devices: a model learning apparatus; and a mask estimation apparatus.

Embodiment 1: Mask Estimation Apparatus

In Embodiment 1, a mask estimation apparatus which receives input audio signals that are mixed audio signals in which sounds from a plurality of sound sources are mixed and outputs mask information for specifying a mask used to extract a specific sound source from the input audio signals or mask information for specifying a mask used to separate a signal for each sound source from the input audio signal will be described.

FIG. 1 illustrates a functional configuration of the mask estimation apparatus 10 in Embodiment 1 of the present invention. The mask estimation apparatus 10 includes a converter 110 and a mask calculator 120.

Converter

The converter 110 is a neural network that receives input audio signals as an input and outputs vectors of a predetermined dimension (embedded vectors). Although the type of the neural network is not particularly limited, for example, the bi-directional long short-term memory (BLSTM) described in NPL 1 may be used. In the following description, the BLSTM will be exemplified.

The neural network model (each parameter of the BLSTM in this example) is trained in advance by a model learning apparatus which will be described later. The converter 110 converts input audio signals into embedded vectors through a trained neural network as described below.

First, the converter 110 performs time frequency analysis of input audio signals, inputs a feature quantity of each time frequency point to the neural network and obtains an embedded vector corresponding to an index n of a time frequency point, which is represented by the following equation.

$$v_n = (v_{n,1}, \ldots, v_{n,D})^T \qquad \text{[Formula 1]}$$

Here, $n \in \{1, \ldots, N\}$ is an index of a time frequency point and D is a degree of embedded vectors output from the neural network.

Mask Calculator

The mask calculator 120 is a processor which receives embedded vectors output from the converter 110 as an input and outputs mask information. The mask calculator 120 fits embedded vectors to a mixture Gaussian model in order to calculate mask information.

Specifically, an average $\mu_c$ and a covariance matrix $\Sigma_c$ which are parameters of the mixture Gaussian distribution and can more appropriately represent embedded vectors are estimated on the assumption that embedded vectors conform to a mixture Gaussian distribution composed of C Gaussian distributions. Here, $c \in \{1, \ldots, C\}$ is an index of a cluster corresponding to each sound source and C is a total number of clusters of sound sources. In addition, $\mu_c$ represents the average of Gaussian distributions corresponding to a cluster c and $\Sigma_c$ represents a covariance matrix of the Gaussian distributions corresponding to the cluster c. A mask estimation value is obtained from the estimated parameters $\mu_c$ and $\Sigma_c$ of the mixture Gaussian distribution according to the following equation.

[Formula 2]

$$\hat{M}_{n,c} = \frac{\mathcal{N}(v_n; \mu_c, \Sigma_c)}{\sum_{c'} \mathcal{N}(v_n; \mu_{c'}, \Sigma_{c'})} \quad (1)$$

Here, $$\mathcal{N}(v; \mu, \Sigma) \quad \text{[Formula 3]}$$

represents a probability density function of a Gaussian distribution in the case of an average $\mu$ and a covariance matrix $\Sigma$.

In this manner, a mask $$\hat{M}_{n,c} \quad \text{[Formula 4]}$$

can be specified by the estimated parameters $\mu_c$ and $\Sigma_c$ of the mixture Gaussian distribution, and thus mask information may be the mask itself or parameters of the mixture Gaussian distribution. Hereinafter, estimates of the parameters $\mu_c$ and $\Sigma_c$ of the mixture Gaussian distribution calculated by the mask calculator 120 are represented as $\hat{\mu}_c$ and $\hat{\Sigma}_c$. Meanwhile, the symbol ^ is meant to be indicated above the immediately following symbols ($\mu$ and $\Sigma$).

The mask calculator 120 obtains parameters of each Gaussian distribution such that a likelihood of the parameters of the mixture Gaussian distribution with respect to embedded vectors is maximized for fitting of the mixture Gaussian model. Specifically, the parameters $\hat{\mu}_c$ and $\hat{\Sigma}_c$ of each Gaussian distribution are repeatedly updated on the basis of embedded vectors with respect to all time frequency points obtained by the converter 110 such that the following log-likelihood function is maximized.

[Formula 5]

$$J_{test}(\mu_{1:C}, \Sigma_{1:C}) = \log P(v_{1:N} | \mu_{1:C}, \Sigma_{1:C}) \quad (2)$$

Figure 3:
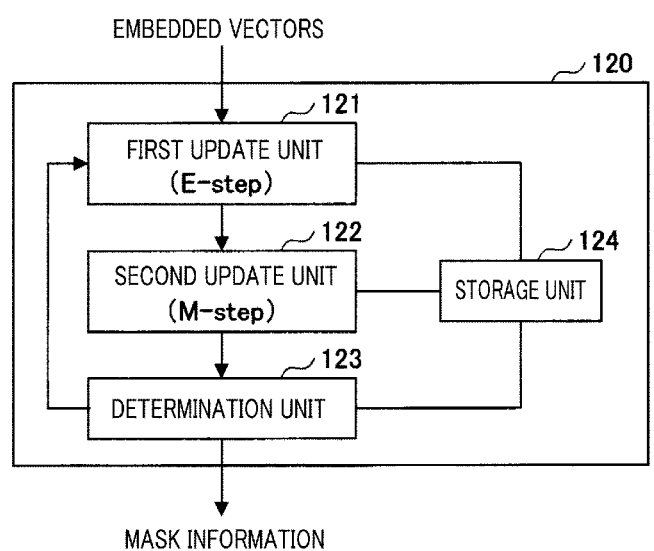
FIG. 3 is a diagram illustrating a functional configuration of a mask calculator of the mask estimation apparatus in Embodiment 1 of the present invention.

Parameter update may be performed, for example, using the EM (expectation-maximization) algorithm. FIG. 3 illustrates a functional configuration of the mask calculator 120 when the EM algorithm is used. The mask calculator 120 includes a first update unit 121, a second update unit 122, a determination unit 123, and a storage unit 124.

The storage unit 124 is a storage device that stores initial values or updated values of parameters used in processing of the first update unit 121, the second update unit 122 and the determination unit 123. Initial values of the parameters $\hat{\mu}_c$ and $\hat{\Sigma}_c$ of the mixture Gaussian distribution are initially stored in the storage unit 124. Initial values can be arbitrarily determined.

First Update Unit

The first update unit 121 is a processor which receives embedded vectors output from the converter 110 as an input and outputs an estimate of a mask. The first update unit 121 performs processing corresponding to E-step of the EM algorithm. Specifically, the first update unit 121 calculates an estimate of the mask which is a posterior probability using the following equation.

[Formula 6]

$$\hat{M}_{n,c} = \frac{\mathcal{N}(v_n; \hat{\mu}_c, \hat{\Sigma}_c)}{\sum_{c'} \mathcal{N}(v_n; \hat{\mu}_{c'}, \hat{\Sigma}_{c'})} \quad (3)$$

Here, $$\hat{\mu}_c, \hat{\Sigma}_c \quad \text{[Formula 7]}$$

represents parameters stored in the storage unit 124.

Second Update Unit

The second update unit 122 is a processor which receives the estimate of the mask obtained by the first update unit 121 and embedded vectors output from the converter 110 as inputs and outputs estimates $\hat{\mu}_c$ and $\hat{\Sigma}_c$ of the parameters. The second update unit 122 performs processing corresponding to M-step of the EM algorithm. Specifically, the second update unit 122 updates $\hat{\mu}_c$ and $\hat{\Sigma}_c$ using the following equation.

[Formula 8]

$$\hat{\mu}_c = \frac{\sum_n \hat{M}_{n,c} v_n}{\sum_n \hat{M}_{n,c}} \quad (4)$$

$$\hat{\Sigma}_c = \frac{1}{\sum_n \hat{M}_{n,c}} \sum_n \hat{M}_{n,c} (v_n - \hat{\mu}_c)(v_n - \hat{\mu}_c)^T \quad (5)$$

(Determination Unit)

The determination unit 123 performs processing of repeatedly updating mask information by causing the first update unit and the second update unit to repeatedly operate until a predetermined criterion is satisfied. Then, when the predetermined criterion is satisfied, the determination unit 123 outputs the values of parameters of Gaussian distributions stored in the storage unit 124 at that time and ends processing.

For example, the predetermined criterion is maximization of a log-likelihood calculated on the basis of estimates of parameters of Gaussian distributions obtained by the second update unit 122 and embedded vectors output from the converter 110. The log-likelihood can be conceived as an evaluated value of likelihood when embedded vectors are clustered on the basis of current estimates of Gaussian distribution parameters and represents repeated update of estimates of Gaussian distribution parameters for more likely clustering.

Specifically, the log-likelihood of Equation (2) is obtained on the basis of estimates of Gaussian distribution parameters obtained by the second update unit 122 and the embedded vectors. Here, it is assumed that the parameters $\mu_c$ and $\Sigma_c$ in Equation (2) are replaced with the estimates $\hat{\mu}_c$ and $\hat{\Sigma}_c$ thereof. Then, if a log-likelihood calculated through previous processing of the determination unit 123 is smaller, it is determined that the criterion has been satisfied, Gaussian distribution parameters stored in the storage unit 124 or a mask estimate obtained from the Gaussian distribution parameters is output as mask information, and processing is ended. If not (if the criterion is not satisfied), it is desirable to return to the first update unit 121 to repeat processing. Alternatively, if a value obtained by subtracting the log-likelihood calculated through previous processing of the determination unit 123 from the currently calculated log-likelihood is less than a predetermined threshold value, it is determined that the criterion has been satisfied. If not, it may be determined that the criterion has not been satisfied. Alternatively, the number of repetition processes may be counted and it may be determined that a predetermined criterion has been satisfied when the number of repetition processes reaches a predetermined number.

Embodiment 2: Model Learning Apparatus

In Embodiment 2, a model learning apparatus which learns the neural network model of Embodiment 1, specifically, the parameters of the neural network constituting the converter 110 when estimation of Embodiment 1 is performed, will be described.

Figure 4:
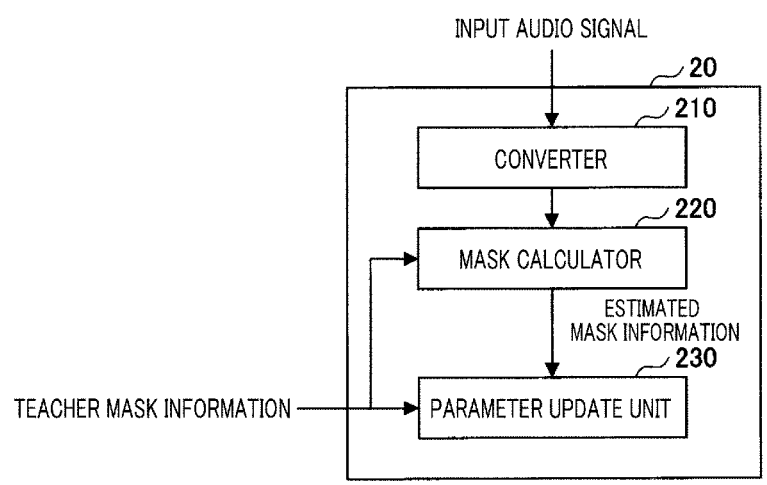
FIG. 4 is a diagram illustrating a functional configuration of a model learning apparatus in Embodiment 2 of the present invention.

FIG. 4 illustrates a functional configuration of the model learning apparatus 20 in Embodiment 2 of the present invention. The model learning apparatus 20 includes a converter 210, a mask calculator 220, and a parameter update unit 230.

Converter

The converter 210 is a neural network that receives input audio signals for learning which are mixed audio signals prepared for learning in advance as an input and outputs vectors (embedded vectors) of a predetermined degree. Here, it is assumed that the input audio signals for learning are prepared in advance for learning and mask information (teacher mask information) that is a correct solution is known in advance. The converter 210 converts the input audio signals for learning into embedded vectors using a neural network (e.g., BLSTM) as in Embodiment 1. Here, although a predetermined initial value is initially used as each parameter of the neural network, updated values of parameters are used when the parameters have been updated in the parameter update unit 230 which will be described later.

Mask Calculator

The mask calculator 220 is a processor which receives embedded vectors output from the converter 210 and outputs mask information estimation results (estimated mask information). The mask calculator 120 fits embedded vectors to a mixture Gaussian model through the same method as that in Embodiment 1 in order to calculate estimated mask information. In this manner, learning of each parameter of a neural network optimal for input audio signals during operation can be realized by estimating a mask through the same method during learning and during operation.

Specifically, although the mask calculator 220 obtains estimated mask information through fitting to the mixture Gaussian model, fitting of the mixture Gaussian model uses an average $\mu_c$ obtained from a covariance matrix $\Sigma_c$ and a teacher mask $M_{n,c}$ provided in advance instead of the EM algorithm.

The covariance matrix $\Sigma_c$ is common for all of $c \in \{1, \ldots, C\}$ and $\Sigma c = \sigma I$. Here, I is a unit matrix and $\sigma$ is a scalar variable that can be set to an arbitrary value. The average $\mu_c$ is calculated from the teacher mask $M_{n,c}$ according to the following equation.

[Formula 9]

$$\mu_c = \frac{\sum_n M_{n,c} v_n}{\sum_n M_{n,c}} \quad (6)$$

Accordingly, the estimated mask information can be obtained using the following equation.

[Formula 10]

$$\hat{M}_{n,c} = \frac{\mathcal{N}(v_n; \mu_c, \sum_c)}{\sum_{c'} \mathcal{N}(v_n; \mu_{c'}, \sum_{c'})} \quad (7)$$

(Parameter Update Unit)

The parameter update unit 230 is a processor that receives teacher mask data known in advance and estimated mask information output from the mask calculator 220 as inputs and updates each parameter of a neural network.

Specifically, the parameter update unit 230 repeatedly updates each parameter of the neural network such that mask information obtained by performing processing of the converter and the mask calculator approaches mask information of a correct solution prepared in advance.

For example, the parameter update unit 230 repeatedly updates each parameter of the neural network until a result of comparison between estimated mask information and teacher mask information satisfies a predetermined criterion. For example, each parameter of the neural network may be updated by defining a cost function that represents a distance between an estimated mask and a teacher mask or by defining a cost function that represents a distance between a signal calculated using the estimated mask and an input audio signal for learning. This is the same as learning processing generally performed in neural networks and it is desirable that the processing be performed through the error propagation learning method or the like. For example, it is desirable that each parameter $\Theta$ of the neural network be updated on the basis of cross entropy of the estimated mask represented by the following formula and the teacher mask $M_{n,c}$ using the following equation.

[Formula 11]

$$\hat{M}_{n,c}$$

-continued

[Formula 12]

$$J_{train}(\Theta) = -\sum_{n,c} M_{n,c} \log \hat{M}_{n,c} \quad (8)$$

Embodiment 3: Sound Source Separation Apparatus

In Embodiment 3, the sound source separation apparatus 30 that extracts a signal of a specific sound source from input audio signals using the mask estimation apparatus 10 of Embodiment 1 will be described. The sound source separation apparatus 30 can extract a signal of a specific sound source alone from input audio signals, separate a signal for each sound source from the input audio signals and output the signal.

Figure 5:
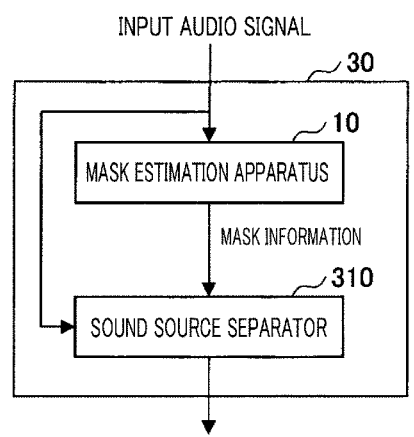
FIG. 5 is a diagram illustrating a functional configuration of a sound source separation apparatus in Embodiment 3 of the present invention.

FIG. 5 illustrates a functional configuration of the sound source separation apparatus 30 in Embodiment 3 of the present invention. The sound source separation apparatus 30 includes a sound source separator 310 in addition to the mask estimation apparatus 10.

Sound Source Separator

The sound source separator 310 is a processor that receives input audio signals and mask information output from the mask estimation apparatus 10 as inputs and outputs a signal of a specific sound source or a signal of each sound source.

Specifically, the sound source separator 310 obtains and outputs a result of estimation of a signal of each sound source by applying a mask configured on the basis of mask information estimated by the mask estimation apparatus 10 to input audio signals. When only a signal from a specific sound source is desired to be output, it is desirable to obtain an estimate of a signal of the sound source by further receiving information c identifying the sound source as an input, configuring a mask from mask information corresponding to the input information identifying the sound source c from among mask information and applying the mask to input audio signals.

Hardware Configuration Example

Figure 6:
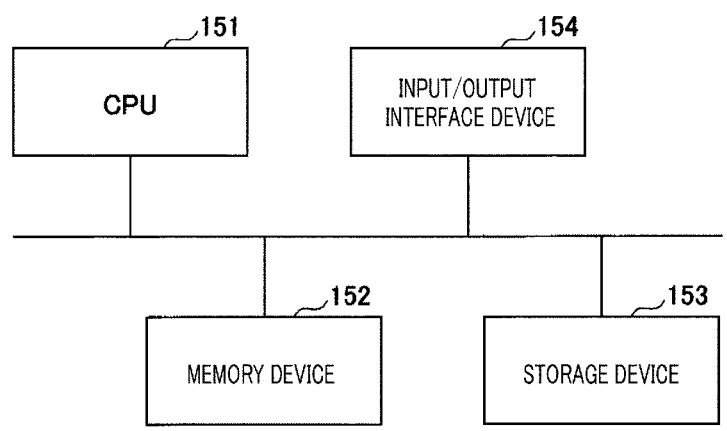
FIG. 6 is a diagram illustrating a hardware configuration example of each apparatus.

FIG. 6 illustrates a hardware configuration example of each apparatus (the mask estimation apparatus 10, the model learning apparatus 20, and the sound source separation apparatus 30) in the embodiment of the present invention. Each apparatus may be a computer including a processor such as a CPU (Central Processing Unit) 151, a memory device 152 such as a RAM (Random Access Memory) and a ROM (Read Only Memory), a storage device 153 such as a hard disk, and the like. For example, functions and processing of each apparatus may be realized by the CPU 151 executing data and programs stored in the storage device 153 or the memory device 152. In addition, information necessary for each apparatus may be input from an input/output interface device 154 and results obtained in each apparatus maybe output from the input/output interface device 154.

Supplement

Although the mask estimation apparatus, the model learning apparatus and the sound source separation apparatus according to the embodiments of the present invention have been described using functional block diagrams for convenience of description, the mask estimation apparatus, the model learning apparatus and the sound source separation apparatus according to the embodiments of the present invention may be realized by hardware, software or a combination thereof. For example, the embodiments of the present invention may be realized by a program causing a computer to execute the functions of the mask estimation apparatus, the model learning apparatus and the sound source separation apparatus according to the embodiments of the present invention, a program causing a computer to execute each procedure of the methods according to the embodiments of the present invention, and the like. In addition, functional units may be combined and used as necessary. Further, the methods according to the embodiments of the present invention may be implemented in different orders from the orders described in the embodiments.

Although the method for improving the accuracy of sound source separation during operation by estimating a mask using the same method during learning and during operation has been described, the present invention is not limited to the above-described embodiments and various modifications and applications can be made without departing from the scope of the claims.

REFERENCE SIGNS LIST

10 Mask estimation apparatus
110 Converter
120 Mask calculator
121 First update unit
122 Second update unit
123 Determination unit
124 Storage unit
20 Model learning apparatus
210 Converter
220 Mask calculator
230 Parameter update unit
30 Sound source separation apparatus
310 Sound source separator
151 CPU
152 Memory
153 Storage device
154 Input/output interface device

The invention claimed is:

1. A mask estimation apparatus for estimating mask information for specifying a mask used to extract a signal of a specific sound source from an input audio signal, the mask estimation apparatus comprising:
    a processor; and
    a memory that includes instructions, which when executed, cause the processor to execute the following steps:
        converting the input audio signal into embedded vectors of a predetermined dimension using a trained neural network model; and
        calculating the mask information by fitting the embedded vectors to a mixed Gaussian model.

2. The mask estimation apparatus according to claim 1, wherein the steps executed by the processor further include:
    performing calculation of the mask information such that a likelihood of parameters of the mixture Gaussian distribution with respect to the embedded vectors is maximized.

3. The mask estimation apparatus according to claim 1, wherein the trained neural network model has been trained with respect to input audio signals for learning prepared in advance such that mask information obtained by performing processing of the processor approaches mask information of a correct solution prepared in advance.

4. A model learning apparatus for learning a neural network model used to estimate mask information for specifying a mask used to extract a signal of a specific sound source from an input audio signal, the model learning apparatus comprising:
- a processor; and
- a memory that includes instructions, which when executed, cause the processor to execute the following steps:
- converting input audio signals for learning and for which mask information is known in advance into embedded vectors of a predetermined dimension using the neural network model;
- calculating a mask information estimation result by fitting the embedded vectors to a mixed Gaussian model; and
- updating parameters of the neural network model until a result of comparison between the mask information estimation result and the mask information known in advance satisfies a predetermined criterion.

5. A sound source separation apparatus for extracting a signal of a specific sound source from an input audio signal, the sound source separation apparatus comprising:
- a processor; and
- a memory that includes instructions, which when executed, cause the processor to execute the following steps:
- converting the input audio signal into embedded vectors of a predetermined dimension using a trained neural network model;
- calculating mask information for specifying a mask used to extract a signal of a specific sound source from the input audio signal by fitting the embedded vectors to a mixture Gaussian model; and
- extracting the signal of the specific sound source from the input audio signal using the mask information.

6. A mask estimation method executed by a mask estimation apparatus for estimating mask information for specifying a mask used to extract a signal of a specific sound source from an input audio signal, the mask estimation method comprising:
- converting the input audio signal into embedded vectors of a predetermined dimension using a trained neural network model; and
- calculating the mask information by fitting the embedded vectors to a mixed Gaussian model.

7. A model learning method executed by a model learning apparatus for learning a neural network model used to estimate mask information for specifying a mask used to extract a signal of a specific sound source from an input audio signal, the model learning method comprising:
- converting input audio signals for learning and for which mask information is known in advance into embedded vectors of a predetermined dimension using the neural network model;
- calculating a mask information estimation result by fitting the embedded vectors to a mixed Gaussian model; and
- updating parameters of the neural network model until a result of comparison between the mask information estimation result and the mask information known in advance satisfies a predetermined criterion.

8. A sound source separation method executed by a sound source separation apparatus for extracting a signal of a specific sound source from an input audio signal, the sound source separation method comprising:
- converting the input audio signal into embedded vectors of a predetermined dimension using a trained neural network model;
- calculating mask information for specifying a mask used to extract a signal of a specific sound source from the input audio signal by fitting the embedded vectors to a mixture Gaussian model; and
- extracting the specific sound source from the input audio signal using the mask information.

9. A non-transitory storage medium for storing a program for causing a computer to execute a mask estimation method, wherein the mask estimation method comprising:
- converting the input audio signal into embedded vectors of a predetermined dimension using a trained neural network model; and
- calculating the mask information by fitting the embedded vectors to a mixed Gaussian model.

* * * * *